(12) United States Patent
Lee et al.

(10) Patent No.: US 6,324,171 B1
(45) Date of Patent: Nov. 27, 2001

(54) MULTICARRIER CDMA BASE STATION SYSTEM AND MULTI-CODE WAVE FORMING METHOD THEROF

(75) Inventors: Dong-Wook Lee; Duck-Bin Im, both of Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/205,567

(22) Filed: Dec. 4, 1998

(30) Foreign Application Priority Data

Oct. 1, 1998 (KR) .................................................. 98-41474

(51) Int. Cl.[7] ............................. H04B 7/216; H04J 11/00; H04L 27/30
(52) U.S. Cl. ......................... 370/342; 370/335; 370/206; 370/209; 375/144; 375/146; 375/148
(58) Field of Search ................................... 370/342, 346, 370/335, 406, 407, 408, 479, 206, 209; 375/144, 146, 148, 206, 208

(56) References Cited

U.S. PATENT DOCUMENTS

| | | | |
|---|---|---|---|
| 5,103,459 | * | 4/1992 | Gilhousen et al. ................... 370/209 |
| 5,319,672 | * | 6/1994 | Sumiya et al. ........................ 375/208 |
| 5,467,367 | * | 11/1995 | Izumi et al. .......................... 375/206 |
| 5,521,937 | * | 5/1996 | Kondo et al. ......................... 375/206 |

OTHER PUBLICATIONS

Performance of Multicarrier DS CDMA Systems; Shiro Kondo and Laurence B. Milstein; 1996; pp. 238–246.
On the Capacity of a Cellular CDMA System; Klein S. Gilhousen, Irwin M. Jacobs, Roberto Padovani, Andrew J. Viterbi, Lindsay A. Weaver, Jr., and Charles E. Wheatley III; 1991; pp. 303–312.
Multicarrier CDMA System with Cochannel Interference Cancellation; Shiro Kondo and Laurence B. Milstein; pp. 1640–1644.

* cited by examiner

Primary Examiner—Wellington Chin
Assistant Examiner—M. Phan
(74) Attorney, Agent, or Firm—Antonelli, Terry, Stout & Kraus, LLP

(57) ABSTRACT

A base station system of a multicarrier CDMA and a data transmission method and a mobile communication system using the same are disclosed. The system includes a base station controller connected with an exchanger for generating random phase values as much as the number of carriers when a call set-up is requested and for outputting a paging information containing the phase values, a pilot signal modulation unit for generating a spread spectrum modulated I-phase pilot signal and Q-phase pilot signal as many as the number of the carriers in accordance with a control of the base station controller, a paging signal modulation unit for generating a spread spectrum modulated I-phase paging signal and Q-phase paging signal having predetermined phase differences compared to the pilot signal as many as the number of the carriers, a plurality of traffic signal modulation units for generating, as many as the number of the carriers, a spread spectrum modulated I-phase traffic signal and Q-phase traffic signal having phase differences between the carriers as much ad the phase transition values inputted from the base station controller compared to the pilot signal, and a plurality of combiners for combining the I-phase signal and Q-phase signal, respectively, inputted from each modulation apparatus corresponding to a corresponding one of the carriers.

8 Claims, 3 Drawing Sheets

MULTICARRIER CDMA BASE STATION SYSTEM AND MULTI-CODE WAVE FORMING METHOD THEROF

BACKGROUND OF THE INVENTION

1. Field of the Invention

The present invention relates to a multicarrier CDMA (Code Division Multiple Access) base station system and a multi-code wave forming method thereof, and in particular to an improved multicarrier CDMA base station system and a multi-code wave forming method thereof, which are capable of preventing a decrease of a signal processing gain due to a correlation between interferences received in different frequencies by assigning random phases to multiple carriers modulated by a user data.

2. Description of the Conventional Art

In the CDMA mobile communication system, a technique for generating a multi-code signal is disclosed in the U.S. Pat. No. 5,103,459 entitled "System and method for generating signal wave forms in a CDMA cellular telephone system" and in the U.S. Pat. No. 5,467,367 entitled "Spread spectrum communication apparatus and telephone exchange system".

In the above-described two patents, a method for generating a multi-code signal at the base station of a single carrier CDMA mobile communication system is disclosed. In the above-described two patents, a spectrum is spread by multiplying the data of all users and the identical pseudo noise (PN). In addition, an orthogonal characteristic is provided between other user signals by multiplying spectrum spread signals of different users and a Walsh function sequences of different indexes.

Namely, the U.S. Pat. No. 5,103,459 is directed to transmitting other user signals based on the CDMA using a multi-code signal. In addition, the U.S. Pat. No. 5,467,367 is directed to converting the data of a user into a serial/parallel data, spreading the spectrum using other codes and then transmitting the data in parallel, and in the receiver, the data are demodulated in parallel and then a parallel/serial conversion is implemented. Namely, when multiple data bits are transmitted in parallel for transmitting the data at a high speed of the device, the multi-code signal is used. In the above-described two patents, the identical carrier is modulated by the sum of all code signals.

In addition, as another conventional multicarrier CDMA method, there is the U.S. Pat. No. 5,521,937 entitled "Multicarrier direct sequence spread system and method". In this patent, the direct sequence spread spectrum signal in which the user data is spread using the pseudo noise code is transmitted to various other frequency channels. In the receiver, the signals received to each frequency channel are combined and then demodulated. In this method, it is possible to obtain both symbol combining gain and signal process gain from the diversity of channel characteristics at each frequency.

In the above-described multicarrier CDMA system, the number of code chips per data bit is reduced by the number of the carriers compared with the single carrier CDMA system. Therefore, in the multicarrier CDMA system, the signal processing gain obtained by processing the spectrum spreading signal of one carrier is reduced by the number of the carrier compared with the signal processing gain of the single carrier system as well. However, when combining the signals received from different frequencies, since the signal components are added with the identical phase but the interference components are added with the ramdom phase, the signal-to-noise ratio after the signal combining is increased by the number of carriers compared with the signal-to-noise ratio received by each carrier receiver. Therefore, the signal processing gain becomes a value obtained by multiplying the signal process gain of each carrier receiver and the number of the carriers. Namely, it is identical with the signal processing gain of the single carrier system. The above-described signal processing gain is obtained when the carrier phases of user signals are random as in the link from the terminal to the base station in the cellular mobile telephone system, and the different carrier experience different phase transition in frequency selective channels.

When all users use the identical carriers as in the link from the base station to the terminal of the cellular mobile telephone system, the signal processing gain of the multicarrier system may be smaller than the single carrier system due to correlation between the interferences received in different frequencies. The following problem may occur.

Since the number of the orthogonal codes used for distinguishing the user is the same as the number of the code chips per data bit, the number of the orthogonal codes in the multicarrier CDMA system is reduced by the number of the carriers compared with the single carrier system using the same bandwidth. In order to overcome the above-described problems, the quasi-orthogonal functions or the random sequences may be used for distinguishing user signals. However, in the quasi-orthogonal function or the random sequence, cross-correlation values between different codes exist. Therefore, the interference from other user signals may occur in the same cell. When all carriers are modulated to the identical signal, the multicarrier CDMA is used, and all user signal modulate the carrier having the identical phase at the same frequency, the phases of the interference components after demodulating in the same cell received in different carrier frequencies are identical. Therefore, in this case, it is possible to obtain a diversity combining gain with respect to the fading of each frequency channel, but it is impossible to obtain a signal processing gain due to the combining of the signals received at each frequency with respect to the above-described components.

SUMMARY OF THE INVENTION

Accordingly, it is an object of the present invention to provide a multicarrier CDMA base station system and a multi-code wave forming method thereof which overcome the aforementioned problems encountered in the conventional art.

It is another object of the present invention to provide a multicarrier CDMA base station system and a multi-code wave forming method thereof which are capable of preventing a decrease of a signal processing gain due to a correlation between interferences received in different frequencies by assigning random phases to multiple carriers modulated by a user data.

To achieve the above objects, there is provided a base station system according to the present invention which includes a base station controller connected with an exchanger for generating a random phase values as much as the number of carriers when a call set-up is requested and outputting a paging information containing the phase values, a pilot signal modulation unit for generating a spread spectrum modulated I-phase signal pilot signal and Q-phase signal pilot signal as many as the number of the carriers in accordance with a control of the base station controller, a paging signal modulation unit for generating spread spectrum modulated I-phase and Q-phase signal paging signals having predetermined phase differences compared to the pilot signal as many as the number of the carriers, a plurality of traffic signal modulation units, each of which generates, as many as the number of the carriers, a spread spectrum modulated I-phase and Q-phase signal traffic signals having phase differences between the carriers as much ad the phase transition values inputted from the base station controller compared to the pilot signal, a plurality of combiners for each combining the I-phase signals and Q-phase signals, respectively, inputted from each modulation apparatus of the carriers, and a radio frequency transmission unit for modulating the signals to a radio frequency using the I-phase signal and Q-phase signal inputted from the combiner of the carriers.

To achieve the above objects, there is provided a data transmission method for a mobile communication system of a multicarrier method which includes the steps of a first step for randomly generating phase values for a phase transition of a carrier from the base station control apparatus when a call set-up is requested, a second step for including the random phase values generated by the base station control apparatus into a paging information, transmitting the spread spectrum modulated paging signal to the mobile station and, at the same time, transiting the carrier phase of the spread spectrum modulated traffic signal by phase values and implementing a modulation for generating phase differences between the carriers, a third step for converting the signal combining the spread spectrum modulated pilot signal, a paging signal and traffic signals into a radio frequency, a fourth step for detecting a phase information with respect to a code phase and each carrier of the receiving signal from the transmitted pilot signal, a fifth step for demodulating a received paging signal using a code phase detected from the pilot signal and a predetermined phase information of each carrier and obtaining a phase information of each carrier of the traffic signal contained in the paging signal, and a sixth step for demodulating a received traffic signal using a code phase of the obtained from the pilot signal and a phase information of the carrier of the obtained from the paging information.

To achieve the above objects, there is provided a multicarrier mobile communication system having a base station and mobile station for transmitting the identical data through a plurality of carriers and demodulating the same wherein the base station comprises a base station controller connected with an exchanger for generating random phase values as many as the number of carriers when a call set-up is requested and for outputting a paging information containing the phase values, a pilot signal modulation unit for generating, as many as the number of carriers, spread spectrum modulated I-phase pilot signals and Q-phase pilot signals in accordance with a control of the base station controller, a paging signals modulation unit for generating, as many as the number of carriers, a spread spectrum modulated I-phase and Q-phase paging signals having a predetermined phase difference compared with the pilot signal, a plurality of traffic signal modulation units each of which generates, as many as the number of carriers, spread spectrum modulated I-phase and Q-phase traffic signals having phase differences between the carriers as much as phase transition values inputted from the base station controller compared with the pilot signal, a plurality of combiners for each combining the I-phase signals and Q-phase signals, respectively, inputted from the modulation apparatus of carriers, and a radio frequency transmission unit for modulating the signals into a radio frequency using the I-phase signal and Q-phase signal inputted from the combiner of the carriers and transmitting the same, and wherein the mobile station comprises a pilot signal receiver for detecting an information for a code phase of a received signal and a plurality of carrier phases, an paging information receiver for demodulating the paging signal using a code phase of the received pilot signal and the carrier phase information, and demodulating a traffic signal using carrier phases information of a traffic signal from the paging signal , and a mobile station controller for controlling the pilot signal receiver and the information receiver, for computing plurality of carrier phases of the paging signal using a plurality of carrier phases of the receiving signal inputted from the pilot signal receiver, for outputting the same to the information receiver, and for computing a plurality of carrier phase information of the traffic signal from the paging information demodulated by the information receiver and outputting the same to the information receiver.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The embodiments of the present invention will be explained with reference to the accompanying drawings.

Figure 1:
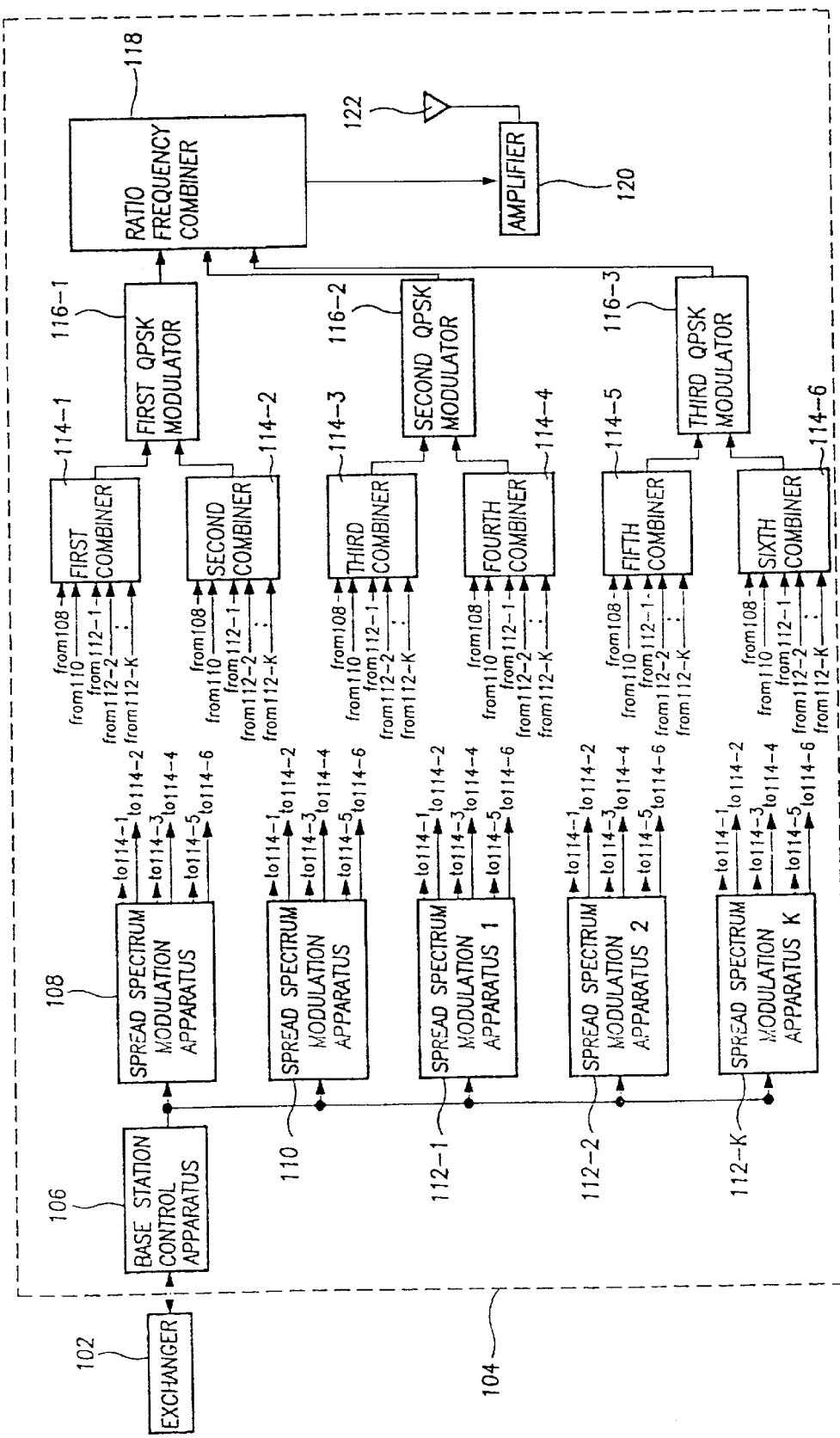
FIG. 1 is a block diagram illustrating a base station system of a multicarrier CDMA.

FIG. 1 is a base station system using a multicarrier CDMA method. Namely, there is shown a base station system capable of supporting a K number of users and using three carriers.

An exchanger 102 is connected with a base station control apparatus 106 of a base station system 104.

The b ase station control apparatus 106 contr ols a pil ot signal spre ad spectrum modulation apparatus 108, a paging signal spread spectrum modulation apparatus 110, and a K number of traffic signal spread spectrum modulation apparatuses 112-1 through 112-K. Here, the base station control apparatus 106 generates a phase transition value of carriers, controls each modulation apparatus, includes the phase transition values into a paging signal and transfers to the mobile station.

The pilot signal spread spectrum modulation apparatus 108 generates two pilot pseudo codes and outputs first, second and third pilot in -phase (I-phase) signals and first, second and third quardraphase (Q-phase) signals.

The paging signal spread spectrum modulation apparatus 110 provides the paging spread spectrum signal generated by multiplying the paging information data generated by the base station control apparatus 106 and the paging pseudo noise code and outputs first, second and third paging I-phase signals and first, second and third paging Q-paging signals. Here, in the present invention, the three phases obtained from three I and Q paging signals in the paging signal spread spectrum modulation apparatus 110 have predetermined values of phase differences from the carrier phases used in pilot signal modulation apparatus 108.

Each of the K traffic signal spread spectrum modulation apparatuses, 112-1 through 112-K, produces a traffic spread spectrum signal obtained by multiplying the user data inputted from the base station control apparatus 106 and the traffic pseudo noise code, and outputs first, second and third traffic-phase signals and first, second and third traffic Q-phase signals. Here, the three phases of the three I and Q phase signals in each of the traffic signal modulation apparatuses 112-1 through 112-K have phase differences from carrier phase used in the pilot signal modulation apparatus, where the values of phase differences are inputted from the base station control apparatus 106.

The first, third and fifth combiners 114-1, 114-3 and 114-5 sum the first, second and third I-phase signals of the pilot, the paging, and K traffic signals, respectively, and output the I-phase signals to the modulators 116-1 through 116-3 of the QPSK(Quadrature Phase Shift Keying) at every carrier frequency, respectively. In addition, the second, four spectrum spreading modulation apparatuses 108, 110, 112-1 through 112-K and outputs th and sixth combiners 114-2, 114-4 and 114-6 sum the first, second and third Q-phase signals of the pilot, the paging, and K traffic signals, respectively, and output the Q-phase signal to the QPSK modulators 116-1 through 116-3, respectively.

The first, second and third QPSK modulators 116-1 through 116-3 modulate the signals to the radio frequency which are the center frequencies $f_1$, $f_2$, $f_3$ using the I-phase signals and the Q-phase signals.

The outputs of the first, second and third QPSK modulators 116-1, 116-2 and 116-3 are summed by the radio frequency combiner 118 and are amplified by the amplifier 120 for thereby transferring through the antenna 122.

Here, the pilot signal spread spectrum modulation apparatus 108 and the first, second and third QPSK modulators 116-1, 116-2 and 116-3 are the elements of the multicarrier pilot signal modulation apparatus. The paging and traffic signal spread spectrum modulation apparatuses 110, 112-1 through 112-K and the first, second and third QPSK modulators 116-1 through 116-3 are the elements of the multicarrier paging and traffic signal modulation apparatus, respectively.

In the base station transmission apparatus of the multicarrier CDMA cellular system according to the present invention, the carrier phases of each user is formed to have different phase relationships at other frequencies in order to eliminate correlation between the connection interferences occured when the codes used for distinguishing the user signals are not orthogonal to each other. For this, the phases of the multiple carriers of one user is formed to have random phases at every call set-up.

Namely, when a call set-up is requested from the exchanger 102, the base station control apparatus 106 generates random phase values $q_1$, $q_2$, $q_3$ and the signal gain A. In addition, the base station control apparatus 106 generates a paging information including the phase values and transmits a paging signal to a corresponding terminal through the paging signal spread spectrum modulation apparatus 110. The above-described paging information includes an inherent information of the mobile station. Namely, this information represents that the corresponding terminal in which the paging signal is demodulated is requested a call set-up. The base station control apparatus 106 inputs the values of cos $q_1$, sin $q_1$, cos $q_2$, sin $q_2$, cos $q_3$, sin $q_3$ based on the random phase values inserted into the paging information to one traffic signal spread spectrum modulation apparatus of the K number of the traffic signal spectrum spreading modulation apparatuses 112-1 through 112-K.

The occasion that the first traffic signal spread spectrum modulation apparatus 112-1 is selected will be described.

The traffic signal spread spectrum modulation apparatus 112-1 generates an I-phase signal and Q-phase signal so that the phases of the carriers modulated by a user data are transited as much as the carrier phase values inputted from the base station control apparatus 106 compared to the pilot signals.

Figure 2:
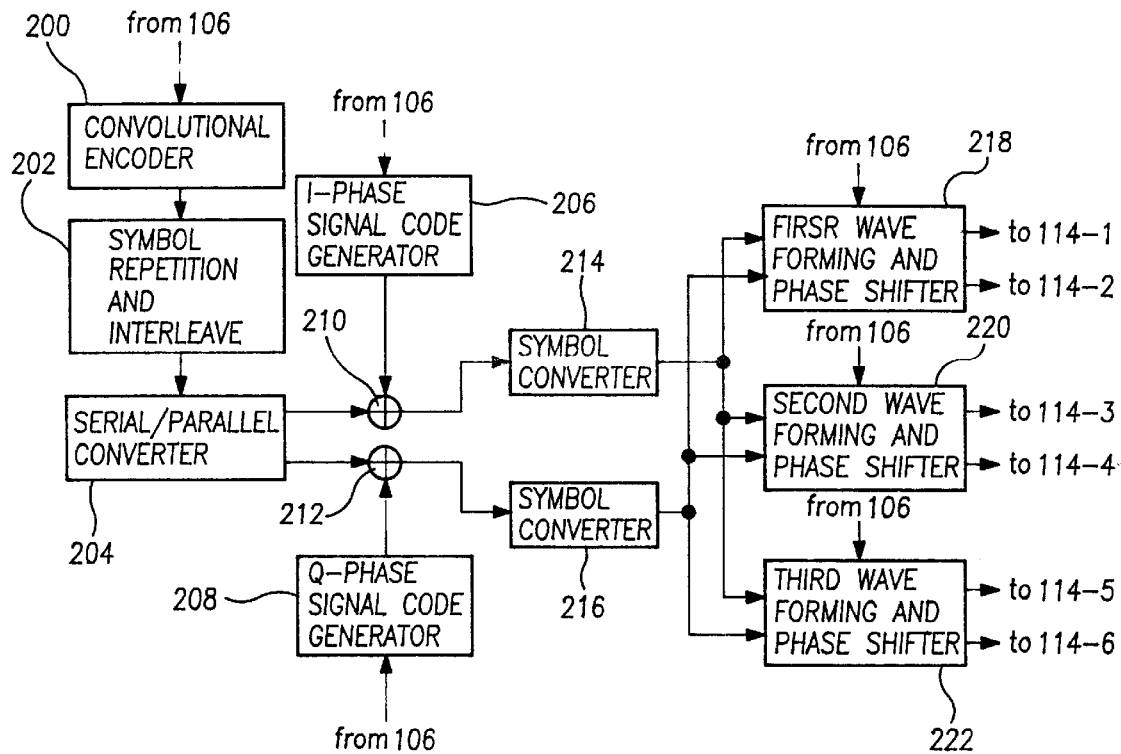
FIG. 2 is a block di agram illustrating a spread spectrum modulation apparatus according to the present invention.

FIG. 2 illustrates the construction of the traffic signal spread spectrum modulation apparatus according to the present invention.

When a user data is inputted through the base station control apparatus 106, the data is processed based on the channel coding process by the convolutional encoder 200. The symbol repetition and interleaving process are performed with respect to the channel-coded user data by the symbol repetition and interleaver 202. The output of the symbol repetition and interleaver 202 is converted into two parallel data by the serial/parallel converter 204. The spectrum of one of two parallel data is spread by the XOR operation at the first XOR gate 210 with an output code of the I-phase signal code generator 206. In addition, the other of parallel data are XORed at a second XOR gate 212 with an output code of the Q-phase signal code generator 208 for thereby implementing a spectrum spreading. The I-phase signal code generator 206 and the Q-phase signal code generator 208 receive an instruction for choosing the code type from the base station control apparatus 106.

The logic value "1" of the two spread spectrum signals generated in the above is converted into "−1" and the logic value "0" is converted into "+1" by the symbol converters 214 and 216, respectively.

The converted two parallel data symbols are inputted into the first, second, third wave forming and phase transition units 218, 220 and 222 which shape the waveform and shift the phase. The six outputs are inputted into the first through sixth combiners 114-1 through 114-6 to be summed with the other channel symbols.

The values (cos $q_1$, sin $q_1$), (cos $q_2$, sin $q_2$) and (cos $q_3$, sin $q_3$) are inputted into the first, second and third wave forming and phase shifters 218, 220 and 222, respectively.

Figure 3:
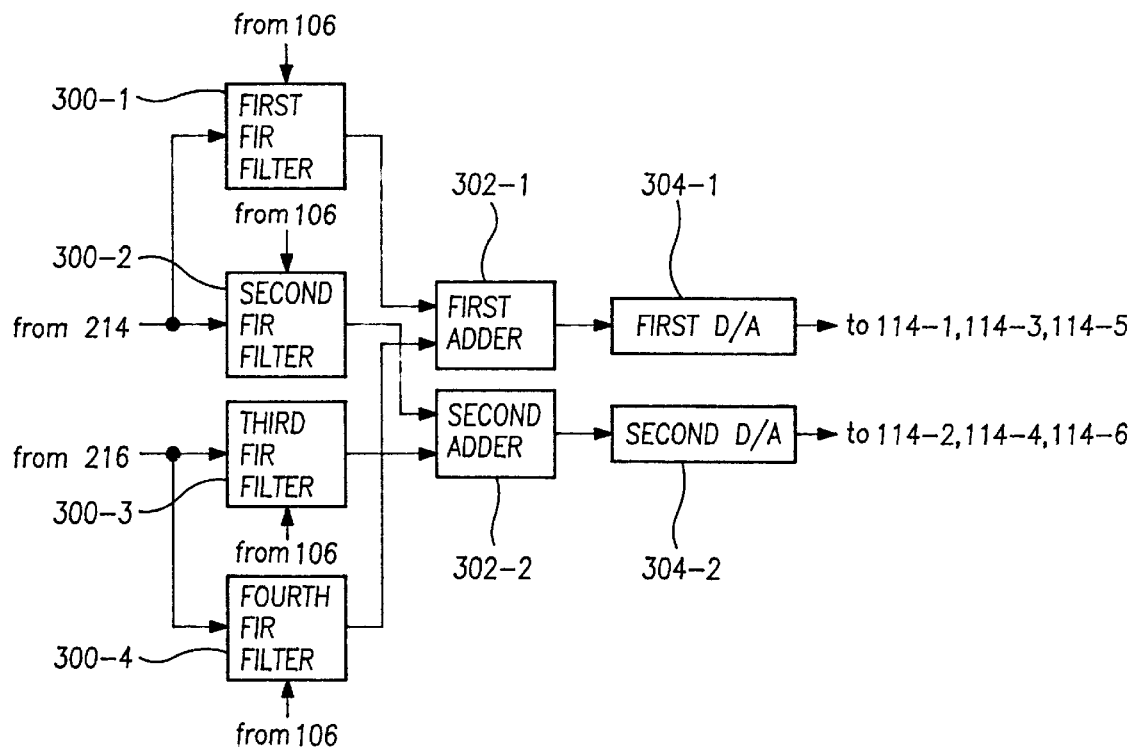
FIG. 3 is a block diagram illustrating a wave forming and phase shifter according to the present invention.

FIG. 3 illustrates the construction of a wave forming and phase shifter according to the present invention.

The wave forming and phase shifter includes four FIR (Finite Impulse Response) filters 300-1 through 300-4 having the same features except for the gain. When the phase information (cos q, sin q) and the signal gain A are received from the base station control apparatus 106, the gain of the first FIR filter 300-1 is set to Acos q, and the gain of the second FIR filter 300-2 is set to −A sin q, and the gain of the third FIR filter 300-3 is set to Acos q, and the gain of the fourth FIR filter 300-4 is set to A sin q. In addition, the output from the first FIR filter 300-1 and the output from the fourth FIR filter 300-4 are added by the first adder 302-1.

The output from the second FIR filter 300-2 and the output from the third FIR filter 300-3 are added by the second adder 302-2. The gain of each FIR filter is changed whenever the transmission power is changed. In addition, the input is +1 or −1, the wave forming and phase transition are concurrently performed based on only the addition and subtraction without the multiplication in the filter. The outputs from the adders 302-1 and 302-2 are converted into the analog signals by the D/A converters 304-1 and 304-2. The converted analog signals are outputted to the first and second combiners 114-1 and 114-2 or the third and fourth combiners 114-3 and 114-4 or the fifth and sixth combiners 114-5 and 114-6 in accordance with the carriers to be modulated and then are combined with the other user data modulation signal. Therefore, in the present invention, it is possible to obtain an effect obtained when the carriers having different random phases used even when multiple users use the output of the same oscillator.

Figure 4:
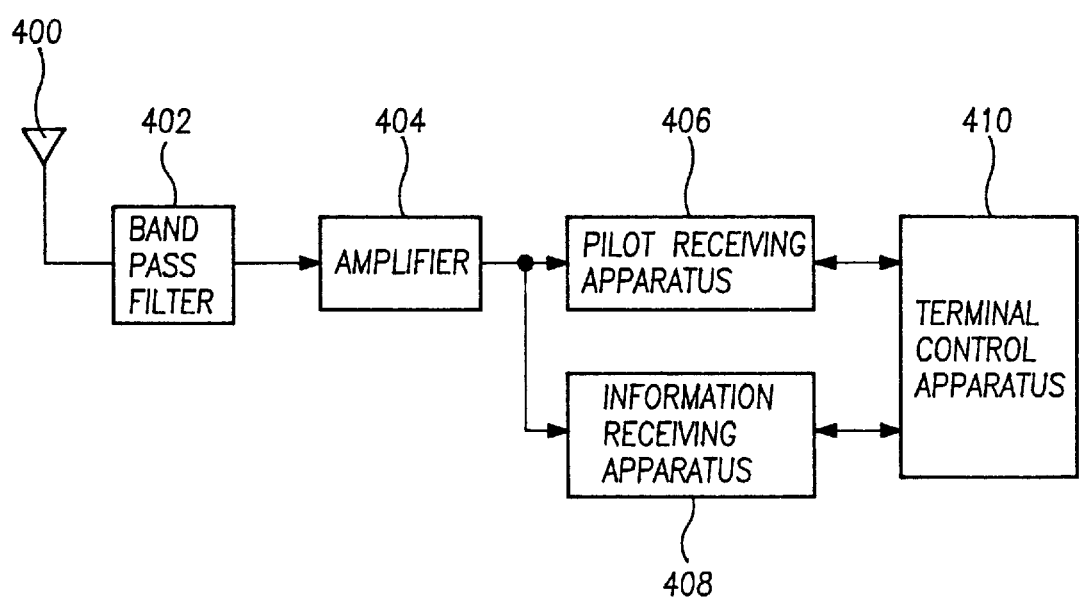
FIG. 4 is a block diagram illustrating a mobile station receiver of a multicarrier CDMA.

FIG. 4 illustrates the construction of the receiver of the mobile station.

The signal received from the antenna of the mobile terminal is inputted into the pilot receiving apparatus 406 through the band pass filter 402 and the amplifier 404. The pilot receiving apparatus 406 detects the pilot signal in which there is not a data information for thereby obtaining a code phase and carrier phase information, and this operation is reported to the terminal control apparatus 410.

The terminal control apparatus 410 computes the carrier phases of the paging channel from the carrier phases of the pilot signal based on a predetermined rule and inputs the carrier phases of paging of channel into the information receiver 408 together with the code phase information. The information receiver 408 demodulates the paging signal using the carrier phase information of the paging signal and the code phase information and transfers the paging information to the terminal control apparatus 410. The terminal control apparatus 410 extracts the carrier phase information of the traffic signal contained in the paging information and inputs the thusly extracted information into the information receiving apparatus 408 for thereby allowing the information receiver 408 to operate in accordance with the traffic signal demodulation mode. The information receiver 408 demodulates the traffic signal and transfers it to the terminal control apparatus 410.

As described above, in the present invention, it is possible to modulate and transmit each data using a random phase differences without using an additional carrier for every user in the base station, so that an effect that the modulation is implemented using a carrier having a random phase difference at every frequency is obtained. In addition, it is possible to remove a correlation between the interferences in different frequencies, so that the decrease of the signal processing gain due to the correlation is effectively prevented.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A multicarrier CDMA base station system, comprising:
    a base station control means connected with an exchanger for generating random phase values as much as the number of carriers when a call set-up is requested and outputting a paging information containing the phase values;
    a pilot signal modulation means for generating a spread spectrum modulated I-phase pilot signal and Q-phase pilot signal as many as the number of the carriers in accordance with a control of the base station control means;
    a paging signal modulation means for generating a spread spectrum modulated I-phase paging signal and Q-phase paging signal having predetermined phase differences compared to the pilot signals as many as the number of the carriers;
    a plurality of traffic signal modulation means for generating, as many as the number of the carriers, spread spectrum modulated I-phase traffic signal and Q-phase traffic signal having phase differences between the carriers as much as the phase transition values inputted from the base station control means compared to the pilot signal;
    a plurality of combiners for combining the I-phase signal and Q-phase signal, respectively, inputted from each modulation apparatus corresponding to a corresponding one of the carriers; and
    a radio frequency transmission means for modulating the signals to a radio frequency using the I-phase signal and Q-phase signal inputted from the combining means corresponding to a corresponding one of the carriers.

2. The system of claim 1, wherein said traffic signal modulation means includes:
    a coding means for coding a user data inputted from the base station control means;
    a symbol repetition and interleaving means for repeating and interleaving the symbol of the coded user data;
    a serial/parallel conversion means for converting an output of the symbol repetition and interleaving means into at least two parallel data;
    a plurality of spread spectrum modulation means for combining an I-phase signal code and Q-phase signal code with parallel data converted by the serial/parallel conversion means, respectively, and for implementing spread spectrum modulation;
    a plurality of symbol conversion means for converting the symbols of a spectrum-spread I-phase signal and Q-phase signal; and
    a plurality of wave forming and phase transition means for receiving the I-phase signal and Q-phase signal inputted from the symbol conversion means, forming a wave form, shifting the phase as much as the phase transition value inputted from the base station control means and obtaining a predetermined phase difference between carrier waves.

3. The system of claim 2, wherein said wave forming and phase transition means includes:
    a plurality of filtering means, in which the phase is controlled in accordance with a phase value inputted from the base station control means and the signal gain, for filtering the symbol-converted I-phase signal and Q-phase signal;
    at least two adding means for receiving the I-phase signal and Q-phase signal from the a plurality of the filtering means and adding the same; and
    two digital/analog conversion means for converting the output from the adding means into an analog signal.

4. The system of claim 3, wherein said filtering means is a FIR(Finite Impulse Response) filter in which the gain is controlled by the base station control 5. In a multi-code wave form generation method for a multicarrier mobile communication system including a base station provided with a base station control apparatus, a pilot signal modulation apparatus, a paging signal modulation apparatus, and a plurality of traffic signal modulation apparatuses and a mobile station provided with a mobile station control apparatus, a pilot signal receiving apparatus and an information receiving apparatus, an improved method, comprising the steps of:

a first step for randomly generating phase values for phase transition of carriers from the base station control apparatus when a call set-up is requested;

a second step for including the random phase values generated by the base station control apparatus into a paging information, transmitting the spread spectrum modulated paging signal to the mobile station and, at the same time, transiting the carrier phases of the spread spectrum modulated traffic signal by the phase value;

a third step for converting the signal combining the spread spectrum modulated pilot signal, a paging signal and a traffic signal into a radio frequency;

a fourth step for detecting the information of a code phase and carrier phases of the receiving signal from the transmitted pilot signal;

a fifth step for demodulating a received paging signal using a code phase detected from the pilot signal and the predetermined phase information of each carrier and obtaining a phase information of each carrier of the traffic signal contained in the paging infromation; and a sixth step for demodulating a received traffic signal using a code phase of the obtained received pilot signal and a phase information of the carrier of the obtained from the paging information.

6. In a multicarrier mobile communication system having a base station and mobile station for transmitting the same data through a plurality of carriers and demodulating it, said base station comprising:

a base station control means connected with an exchanger for generating random phase values as many as the number of carriers when a call set-up is requested and outputting a paging information containing the phase values;

a pilot signal modulation means for generating, as many as the number of carriers, a spread spectrum modulated I-phase pilot signal and Q-phase pilot signal in accordance with a control of the base station control means;

a paging signal modulation means for generating, as many as the number of carriers, a spread spectrum modulated I-phase paging signal and Q-phase paging signal having predetermined carrier phase differences compared to the pilot signal;

a plurality of traffic signal modulation means for generating, as many as the number of carriers, spread spectrum modulated I-phase traffic signal and Q-phase traffic signal having carrier phase differences between the carriers as much as the phase transition values inputted from the base station control means compared to the pilot signal;

a plurality of combining means for combining the I-phase signal and Q-phase signal, respectively, inputted from the modulation apparatus corresponding to each carrier; and a radio frequency transmission means for modulating the signals into a radio frequency using the I-phase signal and Q-phase signal inputted from the combining means corresponding to each carrier and transmitting the same, and said mobile station comprising:

a pilot signal receiving means for detecting an information for a code phase of a received signal and a plurality of carrier phases;

an information receiving means for demodulating the paging signal using the code phase of the received pilot signal and the carrier phase information, and demodulating a traffic signal using a carrier phase information of a traffic signal from the paging signal; and a mobile station control means for controlling the pilot signal receiving means and the information receiving means, computing plurality of carrier phases of the paging signal using a plurality of carrier phases of the received signal inputted from the pilot signal receiving means and outputting the same to the information receiving means, computing a plurality of carrier phase information of the traffic signal from the paging information demodulated by the information receiving means and outputting the same to the information receiving means.

7. The system of claim 6, wherein said traffic signal modulation means includes:

a coding means for coding a user data inputted from the base station control means;

a symbol repetition and interleaving means for repeating and interleaving the symbol of the coded user data;

a serial/parallel conversion means for converting an output of the symbol repetition and interleaving means into at least two parallel data;

a plurality of spread spectrum modulation means for combining an I-phase signal code and Q-phase signal code with parallel data converted by the serial/parallel conversion means, respectively, and for implementing a spread spectrum modulation;

a plurality of symbol conversion means for converting the symbols of a spectrum-spread I-phase signal and Q-phase signal; and a plurality of wave forming and phase transition means for receiving the I-phase signal and Q-phase signal inputted from the symbol conversion means, forming a waveform, shifting the phase as much as the phase transition value inputted from the base station control means and obtaining a predetermined phase difference between carrier waves.

8. The system of claim 7, wherein said wave forming and phase transition means includes:

a plurality of filtering means, in which the phase is controlled in accordance with a phase value inputted from the base station control means and the signal gain, for filtering the symbol-converted I-phase signal and Q-phase signal;

at least two adding means for receiving the I-phase signal and Q-phase signal from the a plurality of the filtering means and adding the same; and two digital/analog conversion means for converting the output from the adding means into an analog signal.

* * * * *